INVENTOR.
CLIFFORD A. ROBERTSON

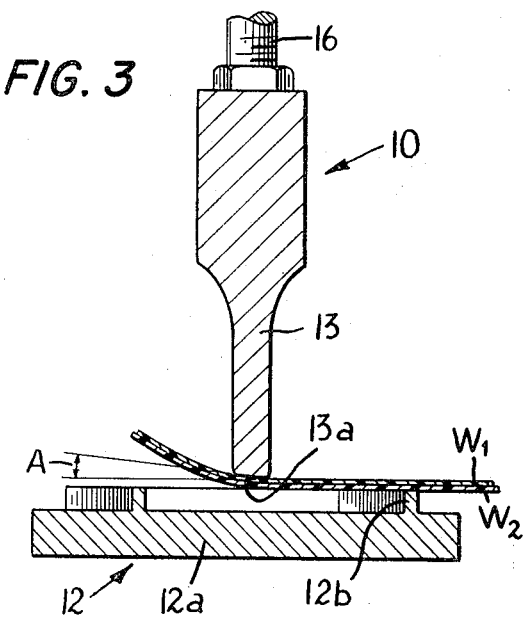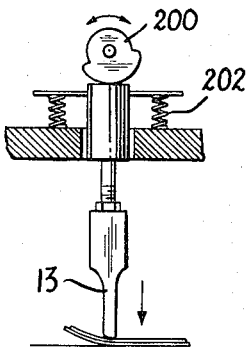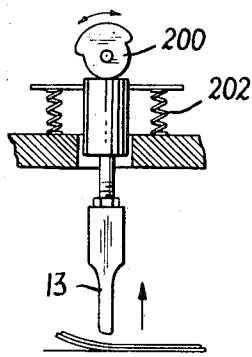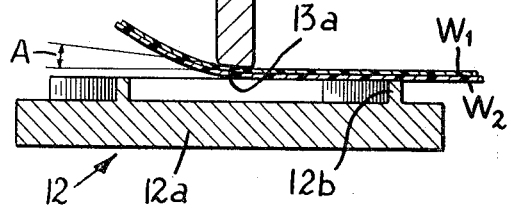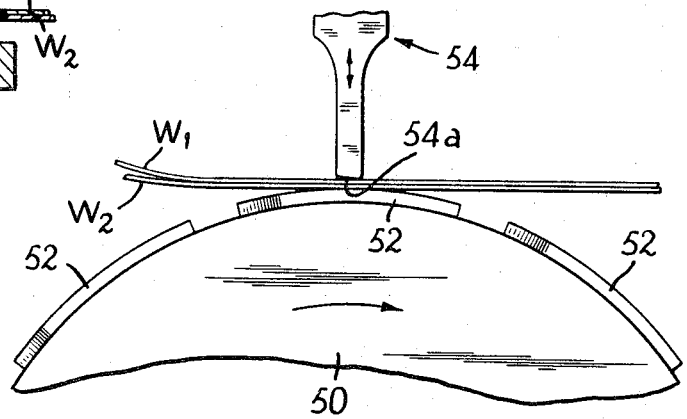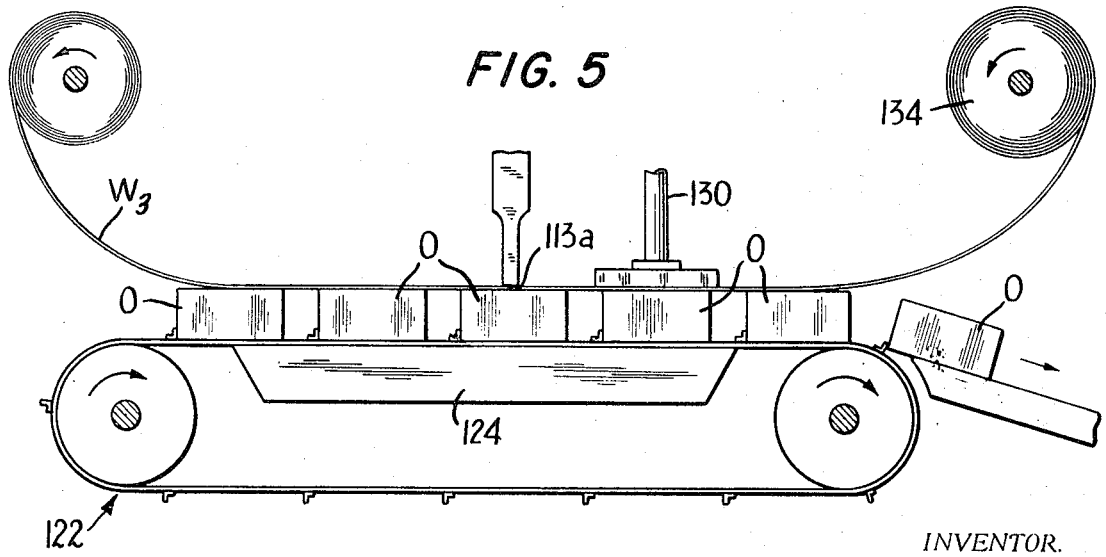

United States Patent Office 3,562,041
Patented Feb. 9, 1971

3,562,041
METHOD AND APPARATUS FOR THE ULTRASONIC JOINING OF MATERIALS ACCORDING TO A PATTERN
Clifford A. Robertson, Bay Shore, N.Y., assignor to Cavitron Corporation, Long Island City, N.Y., a corporation of New York
Filed Oct. 26, 1967, Ser. No. 678,435
Int. Cl. B29c 27/08; B32b 31/18
U.S. Cl. 156—73                    7 Claims

ABSTRACT OF THE DISCLOSURE

A method and apparatus for the ultrasonic joining of materials according to a pattern, at least one of which contains a thermoplastic. The elements to be joined are engaged between an ultrasonically vibrating member having an elongated working tip and a back-up or anvil means having a narrow raised surface corresponding to the desired pattern. The pattern is formed by moving the back-up or anvil means and the materials conjointly relative to the working tip so that the materials are joined in accordance with the pattern; as successive parts of the pattern surface traverse the working tip. The elongation of the working tip is in a direction angled to the direction of motion so as to minimize the area of contact at any instant of time between the working tip and the raised pattern surface.

BACKGROUND OF THE INVENTION

This invention relates to the joining of materials, at least one of which contains a thermoplastic, without the application of external heat.

One way of joining thermoplastic materials or materials containing a thermoplastic is by heating them from an external source to soften or fuse the thermoplastic and permit its flow. Where both materials being joined are thermoplastic and the heat is sufficient to fuse both of them, the two materials coalesce and upon rehardening become securely joined together. Where only one of the materials is a thermoplastic or where that material is a mixture of a thermoplastic and another material, a bond can still be obtained where the other object has a suitable surface structure by penetration of the fused thermoplastic into the structure of that other object.

While methods involving the direct application of external heat to accomplish softening or fusion of the thermoplastic materials generally provide satisfactory results, these methods also have disadvantages which may create serious problems and sometimes make their use impossible. For example, it is not unusual for an object otherwise well suited for manufacture by welding or heat sealing to join together two or more parts to also include parts of materials that would be adversely affected by the high temperature required to fuse the thermoplastic. Among other disadvantages are the high cost of apparatus needed to provide the high temperatures necessary for welding or heat sealing, the amount of space required for the equipment and the need for careful control of the process conditions to avoid burning or distorting the materials. Sometimes, burning or distortion are unavoidable, and some other type of connection, which may be less suitable or more expensive, must be resorted to. In other instances, the design of the product may be compromised by discarding materials that would otherwise be best for the purposes of the object and changing over to materials that can endure the heat of fusion. Also, the structure, geometry or dimensions may have to be altered to adapt the object to the process.

It has heretofore been proposed to employ ultrasonic energy in place of heat to join materials containing thermoplastic. The vibratory energy is converted into heat in localized areas at the region to be bonded without affecting portions of the materials other than at the joint.

Exemplary techniques of joining thermoplastic materials using ultrasonic energy are described in Balamuth et al. U.S. Pats. Nos. 3,224,915, 3,254,402 and 3,272,682, all of which are assigned to the assignee of this invention. These patents concern methods of and apparatus for forming seams which are either straight lines or are in geometric forms which can readily be provided by either shaping the ultrasonic vibrating tool or by imparting motion to the tool relative to the work. Although the techniques of these patents are useful for the purposes that they are intended and provide good results, they are not well adapted to the forming of seams of relatively large area or complex geometry, such as seams extending around irregularly shaped objects or seams that are angularly related, curved, or have angularly related portions.

SUMMARY OF THE INVENTION

There is provided, in accordance with the present invention, a novel and improved technique for joining materials, at least one of which contains a thermoplastic, which is especially advantageous for forming seams of irregular shape but is also useful in forming seams of relatively simple geometric form. In general, the apparatus of the invention can be used in any situation in which a single straight or moderately curved form of ultrasonic tool cannot be used. Also, where the seam to be made involves angularly related portions, such as rectilinear shapes and, usually, any shape having a sharp corner, the method and apparatus of the invention may be preferred over those disclosed in the Balamuth et al. patents since the invention can be accomplished to form a seam with only one joining step, whereas the Balamuth et al. methods adapted to such seam forms will usually require several steps to complete the seam with the desired geometry.

More particularly, the method and apparatus of the invention involve the use of a suitable ultrasonic blade or tool having an elongated working tip, such as the tools shown in Kleesattel et al. U.S. Patent No. 3,113,225. The materials to be joined are moved generally transversely relative to longer dimension of the tool, while being urged toward the working tip, thus producing a force pattern between the members to be joined as they traverse the tool that traces out the shape of the seam to be formed. Where, for example, the objects being joined are two sheets of relatively thin material, the static force between the sheets that traces out the shape of the seam is provided by an anvil having a raised surface defining the seam pattern and the anvil is moved conjointly with the two sheets of material being joined relative to the ultrasonic sealing tool. In other instances, the shape of the seam may be defined by an element of one of the objects being joined. For example, the top rim of a container can serve as the anvil or back-up for the ultrasonic tool, and the other member may be a closure for the container. In any event, the objects to be joined and the pattern anvil, where one is used, are moved conjointly relative to the tool, and the seam is progressively formed as the pattern flange or other pattern surface traverses the tool. In referring to moving the objects to be joined and the pattern relative to the tool, it will be understood, of course, that either the objects and the pattern surfaces or the tool may be stationary while the other moves relative to it.

Although other geometric forms of ultrasonic vibrating tool can be used, it is advantageous to use an ultrasonic tool having a straight working tip, inasmuch as a straight tool gives more uniform results in operation and is not as expensive to produce as curved or other forms of tools. It is also preferable to provide a slight convergence in the downstream direction between the operative faces of the working tip of the tool and the anvil or other back-up, thus providing for smoother entry and passage of the objects being joined through the equipment.

Where the method and apparatus are used with relatively flexible materials, such as thin plastic film or fabrics, it may be desirable to impart an added vibratory motion of relatively low frequency, say 1 to 1000 c.p.s., and high amplitude to either the tool or the anvil or other backup to provide an intermittent, wider gap between them and thus facilitate entry of the work materials. This technique can also be employed to vary the seam form, such as to provide a broken-line, partially interrupted, or other varying seam form.

The apparatus of the invention is well adapted for use in automated equipment. For example, a series of anvils may be carried by an endless conveyor which brings them repeatedly and successively past the sealing station. Meanwhile, the objects to be joined can be suitably conveyed to and through the sealing station and then move on to other operating stations, such as a shearing operation for cutting an object out of web materials after the desired seams have been formed.

One important advantage of the invention is the versatility that it provides. For one thing, the method can be employed with various materials, including materials which contain not only thermoplastic materials but other materials as well. Moreover, as mentioned above, only one of the materials need have a thermoplastic content, the other material having a surface structure adapted to be sufficiently impregnated by the fused thermoplastic material of the first object to form the desired bond between the objects. In addition to being adapted to various materials, the method and apparatus can also be used with various forms of material, such as sheets of various thicknesses, plates and even relatively large masses. The materials may have been previously formed into objects or devices, the objects or devices being of innumerable forms, of hollow or solid construction, and of various materials. Although it is preferable that the seam or seams to be made in a single pass using the apparatus of the invention occur in a single plane, the apparatus and technique can be adapted to curvatures by using a curved tool or conducting the object past the tool in a suitably curved path. The seams may be continuous or segmented, for example in a form resembling sewed stitches, and perhaps the most important advantage of the method and apparatus of the invention resides in the ability to form seams of varying widths and almost any shape, including relatively complex, irregular shapes. The invention offers the further important advantage of enabling the formation of seams of large area by virtue of the progressive formation technique.

BRIEF DESCRIPTION OF THE DRAWINGS

For a better understanding of the invention, reference may be made to the following description of exemplary embodiments, taken in conjunction with the figures of the accompanying drawings, in which:

FIG. 3 is an end view in section of segments of the tool and anvil of FIG. 2, the view being on a larger scale;

FIG. 4 is an end view in section of a modification of the invention, the principal feature being the provision of a drum carrying the pattern anvils;

FIG. 5 is a schematic side elevational view of an embodiment of the invention suitable for joining covers to receptacles; and FIGS. 6A and 6B illustrate a form of the invention embodying superimposed low frequency, high amplitude vibratory movement between the tool or anvil, the two figures illustrating the equipment in different stages of its operating cycle.

DESCRIPTION OF EXEMPLARY EMBODIMENT

Figure 1:
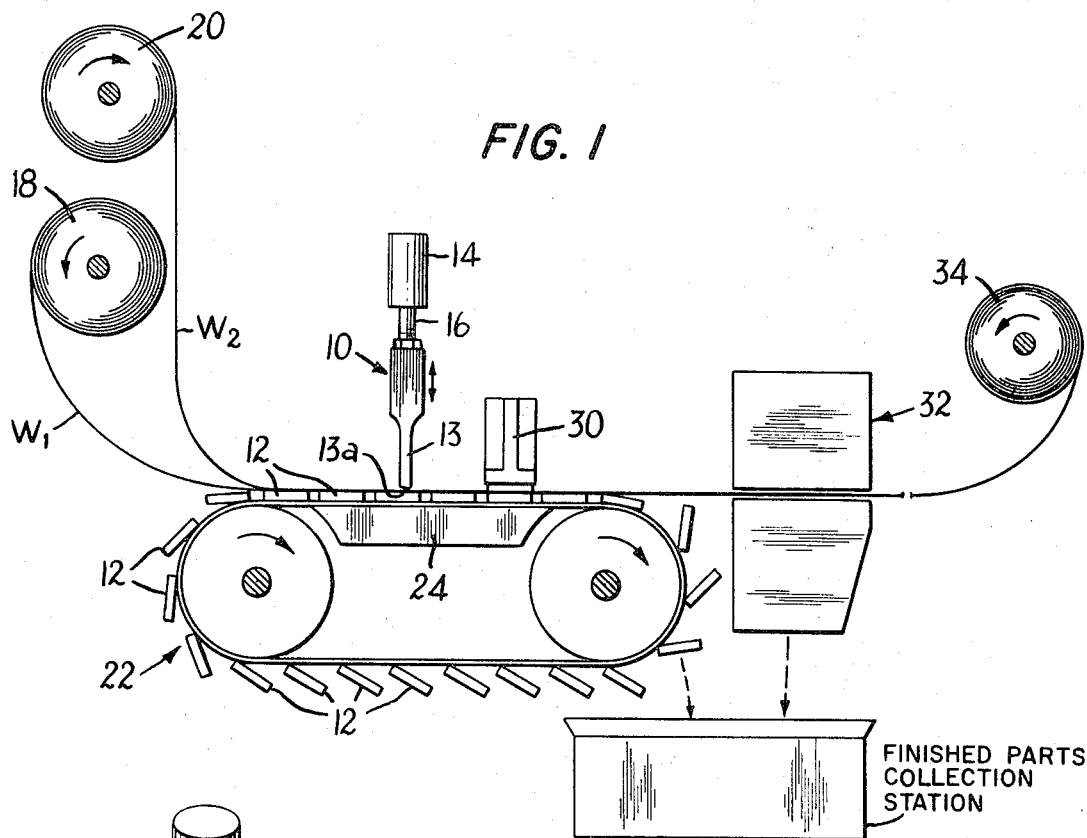
FIG. 1 is a side elevational view, in generally schematic form, of one embodiment of the apparatus, the embodiment being incorporated into a machine for making articles from plastic film, fabric or other web materials.
Figure 2:
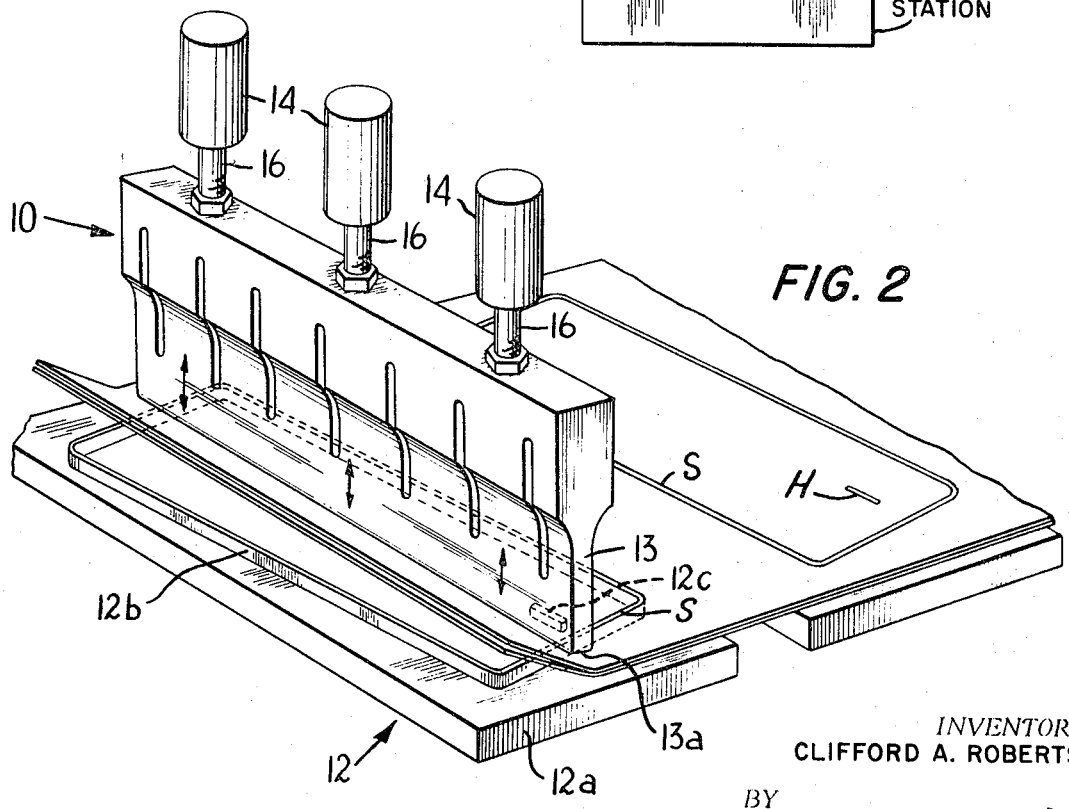
FIG. 2 is a pictorial view of a vibrating tool and anvils suitable for use in the equipment illustrated in FIG. 1.

The embodiment of the invention shown in FIGS. 1 to 3 of the drawings is for joining sheet materials, and the environment in which it is depicted is a machine for manufacturing shirt cuffs by a continuous process. As mentioned previously, the materials to be joined may take various forms, and in the illustrative machines, the materials being joined can be fabrics which are made of thermoplastic fibers or at least contain thermoplastic fibers blended with natural fibers, such as a polyester fiber-cotton mixture. It will be apparent, nonetheless, that the apparatus shown in FIGS. 1 to 3 is well suited for forming seams between two plastic films, between a plastic film and a fabric, or between a plastic film or a sheet of material containing a thermoplastic and various other materials in sheet form. The apparatus and method of the invention can also be used for joining more than two elements. Further, the machine, by installing different pattern anvils, can be adapted for the manufacture of numerous objects from those materials.

The basic apparatus for forming seams between two sheets of material consists of an ultrasonic vibratory tool 10 and an anvil 12, the anvil and tool being mounted so as to press together two pieces of material delivered between them with a predetermined static force, as will be described in more detail below.

The invention may employ a vibratory tool 10 of any of a number of various types, for example, those shown and described in Kleesattel U.S. Pat. No. 3,113,225 referred to above, and reference may be made to that patent for a complete description of the vibrating tool 10. Suffice it to say here that the tool 10 includes a vibratory member or head 13 that is set into ultrasonic vibration by means of one or more transducer units 14 which are coupled to the head 13 by shafts 16. The specific design of the vibratory head 13 may be tailored to the particular materials being joined. The tool is mounted in a holder (not shown) which preferably includes suitable adjusting means for properly positioning the tool relative to the work and which holds it in engagement with the work against the anvil with a predetermined force. Suitable mountings are well known in the art and need not, therefore, be described or shown.

The materials to be joined, specifically the fabrics from which the shirt sleeve cuffs are made, are delivered in web form, as indicated by the references W1 and W2 in the drawings, from supply reels 18 and 20, respectively, and are suitably guided through the space between the vibratory tool 10 and the anvils 12. In the embodiment shown in FIG. 1, there is an endless series of anvils 12 carried by a suitable conveyor mechanism 22 which may, for example, be in the form of a pair of chains to which the opposite ends of the several anvils are hingeably linked, the anvils straddling the chains. As the anvils cross the upper traverse in the direction indicated by the arrows, they pass over a suitable fixed support 24 which serves as a back-up to take the forces of engagement between the vibratory head 12 and the anvil surface.

Referring particularly to FIG. 2, each of the anvils 12 is constituted by a plate 12a formed with an upwardly extending flange 12b having an upper surface in the form of a narrow band defining the pattern for the seam to be made between the two fabric webs W1 and W2. More particularly, the flange 12b is generally rectangular in plan, except for rounded edges that will constitute the ends of the cuff. In addition to the seams defining the border of the cuff, such seams being equivalent to the stitching conventionally found in shirt cuffs, each of the pattern anvils 12 includes a boss 12c which is positioned to form a seam at the buttonhole and which will reinforce the perimeter of the buttonhole after it is slit through the seam portion.

The series of anvils 12 and the webs W1 and W2 are moved conjointly under the vibratory tool 10 and in the course of sliding past and along the working tip 13a of the tool head 13 the webs W1 and W2 are brought under the influence of (1) static pressure between the vibratory head and the raised pattern surface of the pattern rib 12b of the anvil and (2) ultrasonic vibration of the head 13. The combination of static pressure and ultrasonic vibration acting on the webs W1 and W2 causes the thermoplastic materials in the webs W1 and W2 to fuse at the points of forceful contact and permits them to either coalesce, where the contacting materials are both thermoplastic, or causes the thermoplastic material to flow into the porous structures of other materials.

In this way, a fusion bond or seam between the two webs is formed along the pattern surface flanges and bosses of the several anvils 12. The formation of the seam is, of course, progressive beginning with the leading edge of the pattern and tracing out along the pattern surface as the anvil 12 and webs W1 and W2 pass along the tool 10. As shown in detail in FIG. 3 of the drawings, the smooth passage of the webs W1 and W2 past the working tip 13a of the vibratory tool head 13 is facilitated by slightly tapering the tip of the head in the direction of movement of the webs W1 and W2 to form a converging space, as indicated by the angle A. The entry and passage of materials between the tool and anvils can be further facilitated by imparting low frequency, high amplitude vibration to either the tool or anvils, as described below.

Although it is not necessary to do so and good results can be otherwise obtained, it is nonetheless desirable to orient the pattern rib or its equivalent relative to the working tip so that a minimum total band of contact between the tip and pattern surface takes place at any given time. In this way, the energy required to drive the head 13 can be kept at a minimum. For example, with the shirt cuff pattern of the anvils 12 in the drawings, the axis of the pattern flange 12b may be slightly skewed on the base 12a so that its longer edges lie at an angle to the longer dimension of the working tip of the head 13. In this case the straight parts of the pattern are progressively traced out upon relative movement, rather than being formed at one time as they would be if the head were parallel to them.

Upon leaving the welding station, a seam S forming the outline or border of a shirt cuff and a seam H constituting reinforcement for the buttonhole have been formed by the fusion of the thermoplastic content of the fabrics and the coalescence or penetration of the fused materials such that, upon resolidification, strong bonds are formed between the fabrics.

In the embodiment of the invention illustrated in FIG. 1, the webs W1 and W2, with the seams S defining the borders of the cuffs then formed, pass from the welding station to a shearing station where a suitable shearing head 30 comes down in timed relation to the movement of the conveyor to sever away the shirt cuff from the two webs. The cutting head may, for example, include a blade formed to coact with the outside edge of the pattern flange 12b. While the scraps of the webs W1 and W2 leave the conveyor, the shirt cuff will usually remain on the pattern anvils 12 and will be carried around on the anvils and deposited in a suitable receptacle, designated in the drawing by the legend "Finished Parts Collection Station." In the event that the shirt cuff fails to fall clear of the scraps, a suitable vibrating device 32 for shaking the cuff free may be provided. The scrap can then be taken up on a scrap reel 34 and periodically removed for disposal.

FIG. 4 shows another embodiment of the invention; in general it is the same as illustrated in FIG. 1, except that the pattern anvils 12 are replaced by a rotatable cylinder or drum 50 having a series of pattern flanges 52 equivalent to the flanges 12b on the anvils 12. The working tip 54a of the vibratory tool 54 may be tangent to the drum or tapered in the direction of rotation. When it is tangent, the curvature of the drum provides a converging space that facilitates passing the webs along the tool; tapering or sloping the tip provides a greater convergence where desired.

As mentioned previously, the pattern anvils 12 will not be required where one of the objects being joined itself includes a formation adapted to serve the function of defining the seam pattern in the form of a raised surface or flange which coacts with the vibratory head 13 to exert force along the seam. For example, the rim of a receptacle, assuming the walls of the receptacle have sufficient rigidity to support the force required for the ultrasonic seam-forming process, may form an appropriate seam-defining surface. Where one of the objects itself is of an appropriate form to function as an anvil, the objects may be fed onto a suitable conveyor and conducted through the process in a manner similar to that carried out in the embodiment shown in FIG. 1.

FIG. 5 shows, in generally schematic form, an embodiment of the apparatus of the invention along the lines of that described in the preceding paragraph for joining material supplied for a supply roll 120 as a web W3 to rigid objects O, such as plastic receptacles or boxes carried on a suitable conveyor 122. The conveyor 122 traverses a support or backup 124 which enables the tip 113a of an ultrasonic tool 113 to be urged against the objects O and web W to form a seam or joint along the rim or any other projecting surface on the object. The objects, with the web joined to them, pass to a shearing station where a shearing tool 130 trims the web, leaving the sheet joined to the object. The waste material is wound onto a reel 134, while the objects are deposited on a slide 136 for removal and packing or further processing.

The embodiment of FIG. 5 is well suited for joining not only sheets to objects of various forms and materials but also for joining two objects in which one or both has a surface defining the pattern for the seam. The vibratory energy is transmitted through the object engaged by the blade to the interface in much the same manner as through a sheet of relatively thinner material. As another modification of the principle of the invention, objects of relatively flexible material having irregular shapes can be nested in suitable carriers which have a pattern surface defining the seam and depressions adapted to receive or nest parts of the object.

As described in connection with the preceding embodiments, it would be preferable to orient the objects O relative to the tip 113a of the ultrasonically vibrating tool so that only short segments of the pattern outline are in seal-forming relation at any given time.

FIGS. 6A and 6B illustrate as a further modification of the apparatus and method the superimposition over the primary ultrasonic vibration of the tool of vibratory motion of relatively low frequency, say 1 to 1000 c.p.s., and high amplitude to the equipment to intermittently form a wider gap between the tool and anvils and thereby facilitate the entry and passage of materials between them. The low frequency vibratory motion may be imparted to either the tool or the anvils by any suitable mechanism. In the form shown generally schematically in FIGS. 6A and 6B, a rotary cam 200 periodically moves the tool 13 downwardly against return springs 202, the amplitude of vibration of course being established by the cam design and the frequency by the rate of rotation. The frequency can be made variable by driving the cam with a variable speed drive.

The above-described embodiment of the invention is intended to be merely exemplary, and those skilled in the art will be able to make numerous variations and modi-

I claim:

1. Apparatus for joining two or more sheet-like elements, at least one of which contains a thermoplastic material in accordance with a desired pattern, comprising a vibratory member capable of supporting ultrasonic vibrations and having a working tip, anvil means having a raised pattern surface corresponding to the desired pattern, the working tip and pattern surface being positioned in facing relation to receive the elements between them, means for effecting relative movement between the working tip and the anvil means, with the elements to be joined remaining in fixed position relative to the pattern surface defining means during such relative movement, the working tip being elongated in a direction angled to the direction of motion so that there is a minimum area of contact at any instant of time between the working tip and the raised pattern surface, and means holding the vibratory member and said raised pattern surface in engagement with the elements to hold them together with a predetermined force as they pass relative to and in engagement with the working tip.

2. Apparatus according to claim 1 wherein there is a plurality of anvils, and further comprising means for carrying the anvils along an endless path which brings them repeatedly and successively into operative relation to the vibratory member.

3. Apparauts according to claim 1 wherein the opposed faces of the working tip and the raised pattern surface are formed relative to each other such that they are convergent in the direction of movement of the elements relative to the working tip.

4. Apparatus according to claim 1 further comprising means for imparting to the vibratory member a secondary vibratory motion which is of substantially less energy but of substantially greater amplitude than the ultrasonic vibrations in such a manner that there is provided periodically between the vibratory member and the raised pattern surface a gap which facilitates the entry and passage of elements between them.

5. Apparatus according to claim 1 wherein one of the elements to be joined constitutes the anvil, having a raised surface thereon corresponding to the desired pattern.

6. A method of joining two or more sheet-like elements, at least one of which contains a thermoplastic material, in accordance with a desired pattern comprising the steps of generating ultrasonically varying forces along a line having finite width, moving said elements to be joined relative to said line of forces to apply said forces across the surface of one of said elements, said movement being in a direction angled to said line of ultrasonic forces, and firmly supporting said two elements in contact with each other only at the successive limited areas defined by the changing intersection of said line of forces with the desired pattern, whereby the application of said ultrasonic forces seals said elements in accordance with said pattern.

7. The method according to claim 9 further comprising the step of orienting said line of ultrasonic forces with respect to said pattern so as to minimize the area of contact, at any instant of time, of said line of forces and said pattern.

References Cited

UNITED STATES PATENTS

| | | | |
|---|---|---|---|
| 2,633,894 | 4/1953 | Carwile | 156—580X |
| 3,088,343 | 5/1963 | Balamuth et al. | 228—1UX |
| 3,092,945 | 6/1963 | Wizelman | 156—583X |
| 3,205,114 | 9/1965 | Gross | 156—380 |

BENJAMIN A. BORCHELT, Primary Examiner

J. J. DEVITT, Assistant Examiner

U.S. Cl. X.R.

156—580; 228—1